(12) United States Patent
Weaver et al.

(10) Patent No.: US 9,698,439 B2
(45) Date of Patent: Jul. 4, 2017

(54) CELLULOSIC BIOMASS PROCESSING FOR HYDROGEN EXTRACTION

(75) Inventors: Samuel C. Weaver, Knoxville, TN (US); Samuel P. Weaver, Boulder, CO (US); Daniel C. Weaver, Boulder, CO (US); Daniel L. Hensley, Knoxville, TN (US)

(73) Assignee: Proton Power, Inc., Lenoir City, TN (US)

( * ) Notice: Subject to any disclaimer, the term of this patent is extended or adjusted under 35 U.S.C. 154(b) by 44 days.

(21) Appl. No.: 12/758,355

(22) Filed: Apr. 12, 2010

(65) Prior Publication Data

US 2013/0011756 A1    Jan. 10, 2013

Related U.S. Application Data

(63) Continuation-in-part of application No. 12/430,616, filed on Apr. 27, 2009, which is a continuation-in-part of application No. 12/033,740, filed on Feb. 19, 2008.

(51) Int. Cl.
*H01M 8/06* (2016.01)
*C10J 3/10* (2006.01)
*C10J 3/72* (2006.01)

(52) U.S. Cl.
CPC ............... *H01M 8/06* (2013.01); *C10J 3/10* (2013.01); *C10J 3/723* (2013.01); *C10J 2300/092* (2013.01); *C10J 2300/0906* (2013.01); *C10J 2300/0973* (2013.01); *C10J 2300/1646* (2013.01)

(58) Field of Classification Search
None
See application file for complete search history.

(56) References Cited

U.S. PATENT DOCUMENTS

| 3,446,609 A | | 5/1969 | Reinmuth et al. | |
|---|---|---|---|---|
| 4,166,802 A | * | 9/1979 | Slater et al. | 252/373 |
| 4,211,540 A | * | 7/1980 | Netzer | 48/202 |

(Continued)

FOREIGN PATENT DOCUMENTS

| CN | 20181896159 | 7/2011 |
|---|---|---|
| DE | 3627307 A1 | 2/1988 |

(Continued)

OTHER PUBLICATIONS

Ciferno, Jared P. et al., "Benchmarking Biomass Gasification Technologies for Fuels, Chemicals and Hydrogen Production", prepared for U.S. Department of Energy National Energy Technology Laboratory' Jun. 2002, 65 pages.

(Continued)

*Primary Examiner* — Matthew Merkling
(74) *Attorney, Agent, or Firm* — Wilson Patent Law, LLC

(57) ABSTRACT

Methods are disclosed for extracting hydrogen from a biomass compound comprising carbon, oxygen, and hydrogen. The biomass may include cellulose, lignin, and/or hemicellulose. Water is combined with the compound to produce a wet form of the compound. The wet form of the compound is transferred into a reaction processing chamber. The wet form of the compound is heated within the reaction chamber such that elements of the compound dissociate and react, with one reaction product comprising hydrogen gas. The hydrogen gas is processed to generate electrical power.

19 Claims, 10 Drawing Sheets

(56) References Cited

U.S. PATENT DOCUMENTS

| | | | |
|---|---|---|---|
| 4,218,303 A * | 8/1980 | Finn et al. | 585/265 |
| 4,324,643 A | 4/1982 | Durai-Swamy | |
| 4,424,065 A * | 1/1984 | Langhoff et al. | 48/197 R |
| 4,435,374 A | 3/1984 | Helm | |
| 4,448,588 A * | 5/1984 | Cheng | 48/99 |
| 4,497,637 A | 2/1985 | Purdy | |
| 4,592,762 A | 6/1986 | Babu | |
| 4,824,580 A | 4/1989 | Standridge | |
| 5,019,135 A | 5/1991 | Sealock | |
| 5,120,892 A | 6/1992 | Skraba | |
| 5,370,715 A | 12/1994 | Kortzeborn | |
| 5,417,817 A | 5/1995 | Dammann | |
| 5,651,953 A | 7/1997 | Yokoyama | |
| 6,027,635 A | 2/2000 | Busson | |
| 6,133,328 A | 10/2000 | Lightner | |
| 6,141,796 A * | 11/2000 | Cummings | 60/39.12 |
| 6,149,859 A * | 11/2000 | Jahnke et al. | 266/154 |
| 6,250,236 B1 * | 6/2001 | Feizollahi | 110/346 |
| 6,455,011 B1 | 9/2002 | Fujimura | |
| 6,830,597 B1 | 12/2004 | Green | |
| 7,105,244 B2 | 9/2006 | Kamo et al. | |
| 7,132,183 B2 | 11/2006 | Galloway | |
| 7,144,826 B2 | 12/2006 | Roters et al. | |
| 7,192,666 B2 | 3/2007 | Calhoon | |
| 7,208,530 B2 * | 4/2007 | Norbeck et al. | 518/704 |
| 7,220,502 B2 | 5/2007 | Galloway | |
| 7,473,285 B2 | 1/2009 | Russell | |
| 7,658,776 B1 | 2/2010 | Pearson | |
| 8,236,173 B2 | 8/2012 | Bartek | |
| 8,303,676 B1 | 11/2012 | Weaver | |
| 8,465,562 B2 | 6/2013 | Schubert | |
| 8,541,637 B2 | 9/2013 | Babicki | |
| 8,691,115 B2 | 4/2014 | Schubert | |
| 8,696,775 B2 | 4/2014 | Weaver | |
| 8,845,772 B2 | 9/2014 | Schubert | |
| 8,999,022 B2 | 4/2015 | Chen | |
| 9,023,124 B2 | 5/2015 | Weaver | |
| 9,023,243 B2 | 5/2015 | Weaver | |
| 9,221,681 B2 | 12/2015 | Alyaser | |
| 9,254,461 B2 | 2/2016 | Weaver | |
| 9,382,482 B2 | 7/2016 | Weaver | |
| 9,416,326 B2 | 8/2016 | Paganessi | |
| 9,561,956 B2 | 2/2017 | Weaver | |
| 2002/0048545 A1 | 4/2002 | Lewis | |
| 2003/0022035 A1 | 1/2003 | Galloway | |
| 2004/0058207 A1 | 3/2004 | Galloway | |
| 2004/0115492 A1 | 6/2004 | Galloway | |
| 2006/0112638 A1 | 6/2006 | Suyama | |
| 2006/0112639 A1 | 6/2006 | Nick | |
| 2007/0017864 A1 | 1/2007 | Price et al. | |
| 2007/0099038 A1 | 5/2007 | Galloway | |
| 2007/0099039 A1 | 5/2007 | Galloway | |
| 2007/0256360 A1 | 11/2007 | Kindig | |
| 2008/0016770 A1 * | 1/2008 | Norbeck et al. | 48/209 |
| 2008/0086946 A1 * | 4/2008 | Weimer | B01J 19/127 48/89 |
| 2008/0103220 A1 * | 5/2008 | Cherry et al. | 518/702 |
| 2008/0193351 A9 | 8/2008 | Boardman | |
| 2008/0210089 A1 | 9/2008 | Tsangaris | |
| 2008/0300326 A1 | 12/2008 | Schneider | |
| 2009/0007484 A1 | 1/2009 | Smith | |
| 2009/0013601 A1 | 1/2009 | Mandich | |
| 2009/0082604 A1 | 3/2009 | Agrawal | |
| 2009/0158663 A1 * | 6/2009 | Deluga et al. | 48/209 |
| 2009/0318572 A1 | 12/2009 | Sakai | |
| 2010/0018120 A1 | 1/2010 | Kangasoja | |
| 2010/0036181 A1 | 2/2010 | Diebold | |
| 2010/0096594 A1 | 4/2010 | Dahlin | |
| 2010/0129691 A1 | 5/2010 | Dooher | |
| 2010/0186291 A1 | 7/2010 | Yie | |
| 2011/0117006 A1 | 5/2011 | Ljunggren | |
| 2011/0179712 A1 * | 7/2011 | Thacker et al. | 48/73 |
| 2011/0232161 A1 | 9/2011 | Siskin | |
| 2011/0258914 A1 | 10/2011 | Banasiak | |
| 2011/0287498 A1 | 11/2011 | Medoff | |
| 2011/0308157 A1 | 12/2011 | Zhang | |
| 2011/0314736 A1 | 12/2011 | Crespin | |
| 2011/0314881 A1 | 12/2011 | Hatcher | |
| 2012/0058921 A1 | 3/2012 | Van Den Berg | |
| 2012/0101318 A1 | 4/2012 | Ramirez Corredores | |
| 2012/0202897 A1 | 8/2012 | Keskinen | |
| 2012/0266530 A1 | 10/2012 | Ellis | |
| 2013/0008081 A1 * | 1/2013 | Weaver | 44/451 |
| 2013/0079565 A1 | 3/2013 | Miller | |
| 2013/0171532 A1 * | 7/2013 | Weaver et al. | 429/416 |
| 2013/0180489 A1 | 7/2013 | Reeh | |
| 2013/0263498 A1 | 10/2013 | Kania | |
| 2013/0327626 A1 | 12/2013 | Daugaard | |
| 2014/0059921 A1 | 3/2014 | Weaver | |
| 2015/0090939 A1 | 4/2015 | Mahjoob | |
| 2015/0110683 A1 | 4/2015 | McAlister | |
| 2015/0251125 A1 | 9/2015 | Weaver | |
| 2015/0252268 A1 | 9/2015 | Weaver | |
| 2015/0252275 A1 | 9/2015 | Weaver | |
| 2015/0275109 A1 | 10/2015 | Weaver | |

FOREIGN PATENT DOCUMENTS

| | | |
|---|---|---|
| GB | 2310865 | 9/1997 |
| JP | 54 117504 A | 9/1979 |
| WO | WO0166496 | 9/2001 |
| WO | WO2007122880 | 11/2007 |
| WO | WO2008028169 | 3/2008 |
| WO | 2009151368 A1 | 12/2009 |
| WO | WO2011052265 | 5/2011 |
| WO | WO2011097584 | 8/2011 |
| WO | WO2012009168 | 1/2012 |

OTHER PUBLICATIONS

Bain, R.L. et al., :"Highlights of Biopower Technical Assessment: State of the Industry and Technology", NREL—National Renewable Energy Laboratory, Golden, CO, Apr. 2003, pp. 1-47.

Office Action dated Mar. 23, 2012; U.S. Appl. No. 12/033,740; USPTO; 23 pp.

Office Action dated Aug. 30, 2011; U.S. Appl. No. 12/430,616; USPTO.

Notice of Allowance and Fee(s) Due and Notice of Allowability dated Jan. 25, 2012; U.S. Appl. No. 12/430,616; USPTO.

Restriction Requirement dated Jul. 28, 2011; U.S. Appl. No. 12/033,740; USPTO.

Restriction Requirement dated Nov. 29, 2011; U.S. Appl. No. 12/033,740; USPTO.

Office Action dated Dec. 9, 2011 filed in U.S. Appl. No. 12/430,616, filing date Apr. 27, 2009.

Office Action dated Mar. 23, 2012 filed in U.S. Appl. No. 12/033,740, filing date Feb. 19, 2008.

Office action dated Apr. 29, 2013; U.S. Appl. No. 13/645,592; USPTO.

International Search Report for PCT/US2012/055922 dated Apr. 30, 2013, Korean Intellectual Property Office.

Office Action dated Jul. 15, 2013, U.S. Appl. No. 12/827,647, USPTO.

Notice of Allowance dated Nov. 20, 2013; U.S. Appl. No. 13/645,592.

Corrected Notice of Allowability dated Mar. 3, 2014; U.S. Appl. No. 13/645,592.

Office Action dated Sep. 22, 2014; U.S. Appl. No. 14/183,625, USPTO.

Notice of Allowance dated Feb. 9, 2015; U.S. Appl. No. 14/183,625, USPTO.

Office Action dated Sep. 19, 2014; U.S. Appl. No. 12/827,647, USPTO.

Biomass Energy Data Book, 2011, http://cta.ornl.gov/bedb.

De Klerk, "Fischer-Tropsch Process," Kirk-Othmer Encyclopedia of Chemical Technology, Jan. 2013, 36 pages.

Franco, "The study of reactions influencing the biomass steam gasification process," Fuel 82, 2003, pp. 835-842.

(56) References Cited

OTHER PUBLICATIONS

Mao, "Experimental study of hydrogen production by cellulose gasification in supercritical water," Journal of Engineering Thermophysics, vol. 24, No. 3, May 2003, pp. 387-390.
Non-Final Office Action, U.S. Appl. No. 14/679,133, USPTO, Jun. 29, 2016.
Notice of Allowance, U.S. Appl. No. 14/679,133, USPTO, Oct. 26, 2016.
Final Office Action, U.S. Appl. No. 12/827,647, USPTO, Dec. 15, 2016.

* cited by examiner

CELLULOSIC BIOMASS PROCESSING FOR HYDROGEN EXTRACTION

CROSS-RELATED APPLICATIONS

This application is a is a continuation-in-part of U.S. patent application Ser. No. 12/430,616, entitled "CONVERSION OF C—O—H COMPOUNDS INTO HYDROGEN FOR POWER OR HEAT GENERATION," filed Apr. 27, 2009 by Samuel C. Weaver et al., which is a continuation-in-part of U.S. patent application Ser. No. 12/033,740, entitled "CONVERSION OF CELLULOSE INTO HYDROGEN FOR POWER GENERATION," filed Feb. 19, 2008 by Samuel C. Weaver et al., the entire disclosures of which are incorporated herein by reference for all purposes.

BACKGROUND

This application relates generally to the extraction of hydrogen from cellulosic biomass. More specifically, this application relates to the generation of hydrogen for heat and power generation through the use of cellulosic biomass components including C—O—H compounds. Various components of biomass containing C—O—H compounds include cellulose, lignin, and hemicellulose.

There have been several methods of hydrogen extraction from cellulose ($C_6H_{10}C_5$). One of the methods is focused on using microbial bugs along with sodium hydroxide (NaOH) and a catalyst to cause a reaction that releases the hydrogen in cellulose and captures the carbon in cellulose as sodium carbonate ($Na_2CO_3$). There is still a remaining need for developing a simpler and cost effective way of generating hydrogen gas from all C—O—H compounds found in cellulosic biomass more generally, and in a fashion that allows efficient use of the resulting hydrogen for use on-site, for purification, packaging, and distribution or for power generation from the reaction-product hydrogen gas using a reciprocating engine, turbine, or fuel cell.

While various cellulosic biomass hydrogen extraction techniques exist in the art, there is still a general need for the development of alternative techniques that may be cost effective, energy efficient and useful for applications using hydrogen, including hydrogen on demand, and conversion to a hydrogen-rich gas stream that can be directly combusted to produce power and heat. Heat and power applications from efficiently generated hydrogen rather than fossil fuels are useful for reducing the greenhouse gas emissions of other applications that require heat or power, including the production of liquid biofuels. This need may be driven at least in part by the wide variety of applications that make use of hydrogen, some of which have significantly different operation considerations than others. Hydrogen, produced on demand, available for use on the site at which it is generated and therefore that does not require extensive infrastructure for its transportation, and produced at atmospheric pressure and lower temperatures than exist in the prior art, would satisfy that need.

BRIEF SUMMARY

Embodiments provide methods for generating hydrogen from biomass including cellulose, lignin, and hemicellulose sections which have a compound comprising carbon, oxygen, and hydrogen. Water is combined with the compound to produce a wet form of the compound. The wet form of the compound is transferred into a reaction processing chamber. The wet form of the compound is heated within the reaction chamber such that elements comprised by the wet form of the compound dissociate and react, with one reaction product comprising hydrogen gas. The hydrogen gas may be processed to generate electrical power or heat, and alternatively or in conjunction with those processes may be used in a process to generate liquid fuels.

Embodiments may provide several advantages. Hydrogen generated from biomass in accordance with various embodiments may involve reactions that may occur under conditions involving atmospheric pressure. Reaction temperatures may also involve temperatures ranging from 300° C. to 1200° C. depending on the requirements for the form of the product hydrogen. Embodiments may also include mixing water in with the biomass in the form of a liquid, rather than reacted in the form of water vapor; embodiments may thus not involve a water shift reaction. Embodiments may also use a variety of different materials, including but not limited to cellulose, lignin, hemicellulose, or combinations of any of the three. Embodiments may be used to produce hydrogen by separating the $H_2$ from the $CO_2$ and other byproducts, or keeping the $H_2$ and $CO_2$ together to burn for heat, power, CHP, and/or liquid fuels production, merely by way of example.

The input compound to the dissociation process may consist of carbon, oxygen, and hydrogen in some embodiments. In specific embodiments, the compound comprises cellulose, hemi-ellulose or comprises lignin, or a combination of two or more of these components of the cellulosic biomass. The water may comprise liquid water.

A flow of inert gas, such as nitrogen or argon, may sometimes be provided to the reaction chamber. A typical temperature to which the compound will be heated is between 700° C. and 1100° C.

In some embodiments, processing the hydrogen gas comprises burning the hydrogen gas, while in other embodiments, processing the hydrogen gas comprises feeding the hydrogen gas into a fuel cell. In some instances, processing the hydrogen gas may comprise passing reaction-product gases through a reduced-pressure chamber to remove traces of unreacted carbon. In other instances, processing the hydrogen gas may comprise passing reaction-product gases through a water-cooled chamber to remove unreacted water and tars.

Embodiments may include methods for extracting hydrogen from a compound comprising carbon, oxygen, and hydrogen. The methods may include combining water with the compound to produce a wet form of the compound. The wet form of the compound may be transferred into a reaction processing chamber. The wet form of the compound may be heated within the reaction chamber such that elements comprised by the wet form of the compound dissociate and react. One reaction product may include hydrogen gas. The hydrogen gas may be extracted.

In some embodiments, the compound includes cellulose. In some embodiments, the compound includes lignin. In some embodiments, the compound includes hemicellulose. In some embodiments, the compound includes a combination of cellulose, lignin, and/or hemi-cellulose. In some embodiments, the compound consists of carbon, oxygen, and hydrogen.

Some embodiments of methods for extracting hydrogen from a compound comprising carbon, oxygen, and hydrogen may further include providing a flow of an inert gas to the reaction chamber. The inert gas may include at least argon or nitrogen.

In some embodiments, the extracted hydrogen gas may be processed to generate at least electrical power or heat. The extracted hydrogen gas may be processed to produce liquid fuels. The extracted hydrogen gas may be processed by burning the hydrogen gas. The extracted hydrogen gas may be processed by feeding the hydrogen gas into a fuel cell.

In some embodiments, the water comprises liquid water. In some embodiments, processing the hydrogen gas includes passing reaction-product gases through a reduced pressure chamber to remove traces of unreacted carbon. In some embodiments, processing the hydrogen gas includes passing reaction-product gases through a water-cooled chamber to remove unreacted water.

In some embodiments, heating the wet form of the compound includes heating the wet form of the compound to a temperature between 700° C. and 1100° C. In some embodiments, transferring the wet form of the compound into a reaction processing chamber may occur continuously. The continuous transfer of the wet form of the compound into the reactor may utilize a geometry that reduces the presence of air.

Embodiments may includes methods for extracting hydrogen for further processing. The methods may include heating a wet compound, the compound including carbon, oxygen, and hydrogen, such that elements comprised from the wet compound dissociate and react to form at least hydrogen gas. The hydrogen gas may be processed.

In some embodiments, the hydrogen gas may be processed to generate electrical power or heat. In some embodiments, the hydrogen gas may be processed to produce liquid fuels. In some embodiments, processing the hydrogen gas comprises burning the hydrogen gas. In some embodiments, processing the hydrogen gas comprises feeding the hydrogen gas into a fuel cell.

In some embodiments the compound consists of carbon, oxygen, and hydrogen. In some embodiments, the compound comprises cellulose. In some embodiments, the compound comprises lignin. In some embodiments, the compound comprises hemicellulose.

Embodiments may also include apparatuses and/or systems based on these methods for extracting hydrogen from a compound comprising carbon, oxygen, and hydrogen.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and drawings.

BRIEF DESCRIPTION OF THE DRAWINGS

The present invention is described in conjunction with the appended figures.

Figure 1:
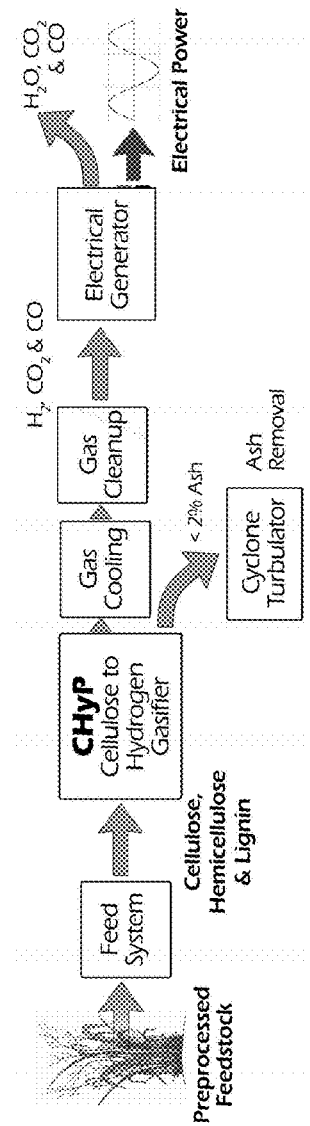
FIG. 1 provides a system diagram showing the several stages that may be involved from providing a feed stock to final production of electrical generation in accordance with various embodiments.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments, it being understood that various changes may be made in the function and arrangement of elements without departing from the spirit and scope of the invention as set forth in the appended claims. Several embodiments are described herein, and while various features are ascribed to different embodiments, it should be appreciated that the features described with respect to one embodiment may be incorporated within other embodiments as well. By the same token, however, no single feature or features of any described embodiment should be considered essential to every embodiment of the invention, as other embodiments of the invention may omit such features.

Specific details are given in the following description to provide a thorough understanding of the embodiments. However, it will be understood by one of ordinary skill in the art that the embodiments may be practiced without these specific details. For example, systems, networks, processes, and other elements in embodiments may be shown as components in block diagram form in order not to obscure the embodiments in unnecessary detail. In other instances, well-known processes, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process may be terminated when its operations are completed, but could also comprise additional operations not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

Furthermore, embodiments may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Merely for purposes of illustration, certain specific reactions involving the components of cellulosic biomass, also referred to as lignocellulose, including cellulose, hemicellulose and lignin and combinations thereof are described herein as an example of how the methods and processes disclosed may be implemented. The techniques have been found by the inventors, however, to be readily applicable more generally to C—O—H compounds and illustrations using any of these components or combinations thereof are not intended in any way to limit the scope of the invention.

Different embodiments may include different combinations of biomass components. For example, combinations of cellulose, lignin, and/or hemicellulose may be used. Many biomass feedstocks may have one or more of a mixture of cellulose, lignin, hemicellulose and/or trace minerals in their component materials. The chemistries described above may thus govern the processing of the feedstock into a process gas stream of hydrogen and $CO_2$ and trace gases.

Some embodiments may utilize hydrous pyrolysis whose input may be a blend of lignocellulosic feedstocks and water. This may have similarities to many of the existing syn-gas production technologies with the advantages that the reaction may be combined into a single step, a high-hydrogen gas mixture may be produced, the process may be very tolerant to moisture in the input feedstock, and the resulting gas stream can be directly combusted in internal combustion engines.

For example, the biochemical composition of lignocellulosic feedstocks may have three main components: cellulose, lignin, and hemicellulose. Different feedstocks (which may include, but are not limited to, hardwoods, softwoods, grasses, fruits) may have different relative amounts of these three main classes of components. The following provides methods that may be used to calculate the ratio of water needed by each component of feedstock to minimize the solid carbon waste and generation of carbon monoxide in accordance with various embodiments. Using the prescribed amount of water in the reaction may generate a gas product mixture that can be directly combusted in reciprocating engines, and may maximize the generation of hydrogen molecules for bio-hydrogen production.

The general reaction class driven by a hydrous pyrolysis process for some embodiments may be described as:

$$C_xH_yO_z+(2x-z)H_2O=xCO_2+(2x+y/2-z)H_2.$$

So for each mole of lignocellulosic component to be completely converted to $CO_2$ and $H_2$, the number of moles of water required may be described as $2x-z$.

The dominant structures in the biochemical composition of lignocellulosic materials and the water for complete reaction may be as follows and are provided merely as examples:

| Biochemical Component | Chemical Formula | Molecular Mass (g/mol) | Weight Percent of Feedstock | Moles of water required per mole of component | Comments |
|---|---|---|---|---|---|
| Cellulose | $C_6H_{10}O_5$ | 162 | 33-50% | 7 (77.78 wt %) | More in hardwoods |
| Lignin | $C_{9+n}H_{10+3n}O_{2+n}$ | 150 + 31n | 15-25% | 16 + n (wt % = [18(16+ n)] [150 + 31n] | $0.9 < n < 1.4$ depending on feedstock |
| Xylan | $C_{17}H_{36}O_8$ | 368 | 5-11% | 26 (127 wt %) | More in hardwoods |
| Glucomannan | $C_{35}H_{49}O_{29}$ | 933 | 1-20% | 41 (79 wt %) | Mostly in softwoods |

For a biomass feedstock with component weight percentages of C % cellulose, L % lignin, G % glucomannan, and X % xylan, the mass water $M_w$, to be added per mass of dry input feedstock mass may be:

$$M_w = \{0.7778C + [18(16+n)/(150+31n)]L + 0.79G + 1.37X\}M_F.$$

Merely by way of example, for a hardwood with 45% cellulose, 30% lignin with n=1.2, 2% glucomannan, and 23% xylan, the weight percentage of water to bone-dry cellulosic mass may be 117.59% for complete reaction.

For an input feedstock that is not bone dry (the normal situation) with W % weight percent water, the dry mass of cellulosic feedstock $M_F$ found in the total delivered feedstock $M_T$ may be described as:

$$M_F = (1-W)M_T.$$

So for a delivered mass $M_T$ of feedstock at W weight percent water, the remaining mass of water to be added $M_A$ may be:

$$\begin{aligned}M_A &= M_w - WM_T. \\ &= M_T(1-W)(0.7778C + [18(16+n)/(150+31n)]L + \\ &\quad 0.79G + 1.37X]) - WM_T \\ &= M_T\{(1-W)(0.7778C + [18(16+n)/(150+31n)]L \\ &\quad 0.79G + 1.37X]) - W\}.\end{aligned}$$

In some embodiments, a feed stock may be characterized by an ultimate elemental analysis, rather than the biochemical composition used in the section above. In this case, the weight percentage of the chemical elements found in the feedstock may be provided by the analysis. If the information may be provided in this manner, the following provides an example for pine sawdust of the input to the analysis:

| Chemical Element | Weight percentage (dry) |
|---|---|
| C | 51.3 |
| H | 6.13 |
| O | 42 |
| N | .12 |
| S | .02 |
| Cl | .07 |
| F | — |
| Br | — |
| Total | 99.64 |

Because the participant in the reactions of interest are mainly C, H, and O, and because these elements are over 99% of the dry mass of the feedstock, one may consider only those elements when determining the mass of water to be added to the input feedstock. For an input feed stock with dry mass weight percentage % C of carbon, % H of hydrogen, and % O of oxygen, and using a proto-molecule of $C_xH_yO_z$, the reaction of interest may be described as:

$$C_xH_yO_z + (2x-z)H_2O = xCO_2 + (2x+y/2-z)H_2$$

So for each mole of lignocellulosic component to be completely converted to $CO_2$ and $H_2$ the number of moles of water required is $2x-z$.

To find the values of x, y, and z using the ultimate elemental analysis, the following can be calculated for a molar mass of 1 g/mole of input feedstock:

$$x = \%\ C/mass(C)$$

$$y = \%\ H/mass(H)$$

$$z = \%\ O/mass(O).$$

The number of moles of water required to react all of the carbon atoms to carbon dioxide is $2x-z$, which may be represented as:

$$moles(H_2O) = 2\%\ C/mass(C) - \%\ O/mass(O).$$

The mass percentage of water $M_w$ to be added relative to the dry input feedstock mass may be thus:

$$M_w = [mass(H_2O) \times (2\%\ C/mass(C) - \%\ O/mass(O))] M_F.$$

For the example feedstock of pine sawdust, the equation evaluates as:

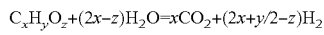
$$moles(H_2O) = 0.085 - 0.02625 = 0.05875$$

$$mass(H_2O) = 18.$$

$$M_w = 1.0575 M_F.$$

For an input feedstock that is not bone dry (the normal situation) with W % weight percent water, the dry mass of cellulosic feedstock $M_F$ found in the total delivered feedstock $M_T$ may be described as:

$$M_F = (1-W)M_T.$$

So for a delivered mass $M_T$ of feedstock at W weight percent water, the remaining mass of water to be added $M_A$ may be:

$$\begin{aligned}M_A &= M_w - WM_T \\ &= M_T(1-W) \\ &\quad [mass(H_2O) \times (2\%\ C/mass(C) - \%\ O/mass(O))] - WM_T \\ &= M_T \\ &\quad \{(1-W)[mass(H_2O) \times (2\%\ C/mass(C) - \\ &\quad \%\ O/mass(O))] - W\}.\end{aligned}$$

Merely by way of example, for 1 tonne of pine sawdust at 25% moisture content, the mass of water to be added may be:

$$\begin{aligned}M_A &= 1\{0.75(1.0575) - .25\} \\ &= 0.543\ tonne.\end{aligned}$$

So for the input tonne of delivered feedstock, there may be 750 kg of dry feedstock and 250 kg of water. By adding 543 liters of water (543 kg), for example, the total mass of water may be 793 kg, or 105.73% of the input dry mass of feedstock, insuring that all carbons may be reacted into carbon dioxide in the pyrolysis process.

Reaction 1 of Conversion of Cellulose into Hydrogen

Cellulose has a molecular formula of $C_6H_{10}O_5$. One possible reaction is that cellulose is disassociated in an inert gas atmosphere or with minimal other gases present upon heating to release $H_2O$ and to generate carbon residue. The reaction may be described by:

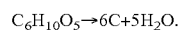
$$C_6H_{10}O_5 \rightarrow 6C + 5H_2O.$$

However, this is different from the inventor's discovery. The inventor previously studied carbonizing cotton for production of carbon fiber. When started, about 15 kg of cotton was introduced to a heating chamber. When the heating cycle ended, about 3 kg of the carbonized cotton was left. It was puzzling that the average yield of the carbon content was 20%-25% at the time of the experiment.

A further understanding of this observation in this experiment leads to the present invention. If the carbon consumes all the oxygen in the cellulose to form carbon dioxide ($CO_2$), the reaction may be described by:

$$2C_6H_{10}O_5 \rightarrow 5CO_2 + 7C + 10H_2.$$

Hence, the remaining carbon may be calculated by using molecular weight as follows:

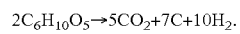
$$(7\ moles \times M_r\ of\ carbon)/(2\ moles \times M_r\ of\ cellulose) = (7 \times 12)/(2 \times 162) = 26\%.$$

In addition, if the carbon consumes all the oxygen in the cellulose to form carbon monoxide (CO), the reaction may be defined by:

$$C_6H_{10}O_5 \rightarrow 5CO + C + 5H_2.$$

The remaining carbon may be estimated as below:

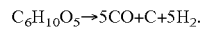
$$M_r\ of\ carbon/M_r\ of\ cellulose = 12/162 = 7\%.$$

Therefore, it is likely that the dominant reaction during cellulose heating (pyrolysis) may result in a mixture of CO and $CO_2$, with $CO_2$ dominant in the mixture. Hence, cellulose heated in an inert gas may result in the following chemical reaction:

$$2C_6H_{10}O_5 \rightarrow 5CO_2 + 7C + 10H_2 \quad \text{(Reaction 1a).}$$

Additional reactions for hydrogen to be combusted to form water and for carbon to be combusted to form carbon dioxide are defined as below:

$$2H_2+O_2\rightarrow 2H_2O \quad \text{(Reaction 1b)}$$

$$C+O_2\rightarrow CO_2 \quad \text{(Reaction 1c)}.$$

The inventors have performed experiments by using nitrogen gas instead of argon to displace air, because nitrogen gas costs less than argon gas. However, the average yield of carbon may be dropped to 17% from 20-25% when gas is switched from argon to nitrogen, which may be due to the formation of CN, or perhaps nitrogen may not displace oxygen as well as argon gas.

Hydrous Pyrolysis for the Production of Hydrogen from Cellulose

A possible reaction for generating hydrogen from cellulose by adding liquid water to the cellulose and heating the combination to 1000° C. (hydrous pyrolysis) may be defined by:

$$C_6H_{10}O_5+7H_2O\rightarrow 6CO_2+12H_2 \quad \text{(Reaction 2a)}.$$

Hydrogen may be subsequently burned in oxygen defined by:

$$2H_2+O_2\rightarrow 2H_2O \quad \text{(Reaction 2b)}.$$

In reaction 2a, the net enthalpy of the reaction has been calculated as 1241 kJ/mol.

When the hydrogen burn in Reaction 2b is considered, the following energy may be released:

$$\Delta H=12(-241.8)=-2902 \text{ kJ/mole}.$$

Thus the net energy generation is 1661 kJ/mole cellulose. For each gram of cellulose consumed the following energy may be released:

$$\Delta H = 3108 \text{ kJ}/162 \text{ g Cellulose}$$
$$= 10.25 \text{ kJ/g cellulose}.$$

The net thermal energy released by burning the hydrogen produced from cellulose via the CHyP reaction may be described as:

(10.25 kJ/g)(1,000,000 g/tonne)(1 MW-hr/3,600,000 kJ)=2.84 MW-hr/tonne.

The above analysis may show the thermodynamics of different embodiments works favorably. Embodiments may thus address many of the issues identified as problems in the gasification space.

For example, some embodiments may provide simplified designs that favor scalability over a very wide range from home unit size to commercial power production. Some embodiments may focus on the thermal issues causing heat losses that tend to make gasification technologies inefficient. Although some embodiments may produce excess heat, heat losses to the environment and through the exiting gases may be accounted for. Because of the exothermic nature, the leverage of thermal power out from the input power may be over 10.

Some embodiments may be optimized to minimize tar production as well as CO and $C_xH_y$. For some embodiments, cellulose that contains water may be a benefit, not an energy consuming issue as with most biomass energy processes in which drying of the feedstock is required to minimize water content. The feedstock in many embodiments may need not be dried before processing. By generating hydrogen on-demand in some embodiments, the benefits of hydrogen may be realized without the difficulties normally associated with hydrogen, mainly the storage and distribution issues.

Because the produced gas contains $CO_2$, the dilution of the hydrogen may actually benefit the burning in an internal combustion engine in some embodiments through reduction of flame temperature and speed, and the subsequent reduction of $NO_x$ pollutants. The flame produced from combusting the product gas may contain a small amount of $C_xH_y$ and CO that makes the normally invisible flame visible, rendering the handling safer in some embodiments.

In some embodiments, lignin and/or hemi-cellulose in cellulosic biomass may also serve as effective sources of hydrogen. Since these may be waste products from several sources, in particular, cellulose to ethanol production, this could be an effective addition to the renewable energy picture using the processes described herein.

Hydrous Pyrolysis for the Production of Hydrogen from Lignin

Lignin has a nominal composition: $C_9H_{10}O_2(OCH_3)_n$, where n is the ratio MeO:C9, which is the ratio of methoxylated groups to phenylpropanoid groups in the lignin. The value of n may be roughly 0.94 for softwoods and paper, 1.18 for grasses, and 1.4 for hardwoods, merely by way of example. Using the equivalency to re-write the lignin formula may result in the following:

$$C_9H_{10}O_2(OCH_3)_n=C_{9+n}H_{10+3n}O_{2+n}.$$

In accordance with various embodiments, a CHyP hydrogen generator may drive the following reaction:

$$C_{9+n}H_{10+3n}O_{2+n}+(16+n)H_2O=>(9+n)CO_2+(21+2.5n)H_2 \quad \text{(Reaction 3a)}.$$

Merely by way of example, for n=1, this corresponds to adding enough water to the lignin to bring the composition of the wet compound to 62.8 wt % water.

The net enthalpy of this reaction at 1000° C. output temperature may be described as:

(9+n)(−393.5)+(21+2.5n)(29.1)+1592+(16+n)(285.8)
=2008−34.95n kJ/mol.

However, when the hydrogen burn is considered, the following energy may be released:

$$\Delta H=21+2.5n(-241.8)=-5078-605n \text{ kJ/mole}.$$

Thus for n=1, merely by way of example, the net energy generation is 5683−1973=3710 kJ/mole lignin. For each gram of lignin consumed the following net energy may be released:

$$\Delta H=3710 \text{ kJ}/181 \text{ g lignin}=20.5 \text{ kJ/g lignin}.$$

The net thermal energy released by burning the hydrogen produced from lignin via this reaction may be described as:

(11 kJ/g)(1,000,000 g/tonne)(1 MW-hr/3,600,000 kJ)=3.05 MW-hr/tonne.

Hydrous Pyrolysis for the Production of Hydrogen from Hemicelluloses

In some embodiments, hemicelluloses in lignocellulosic feedstocks may also serve as an effective source of hydrogen. Hemicelluloses are polysaccharides composed of sugars, that may include, but are not limited to, glucose, xylose, mannose, galactose, rhamnose, arabinose, and glucomannan. The chemical formula for these sugar building blocks may be described as $C_5H_{10}O_5$ and $C_6H_{12}O_6$. Common hemicellulosic materials in North American lignocellulosic biomass include xylan ($C_{17}H_{36}O_8$) and glucomannan ($C_{35}H_{49}O_{29}$). Because exact bond dissociation energies for the many hemicellulose polysaccharides may depend on their exact chemical composition and environments, the average values for cellulose (mass-weighted) may be used in the following analyses.

Hydrogen from Xylan

The chemical formula for xylan may be described as $C_{17}H_{36}O_8$ and the reaction driven by some embodiments may be described as:

$$C_{17}H_{36}O_8 + 26H_2O = 17CO_2 + 44H_2.$$

This corresponds to adding enough water to the xylan to bring the composition of the wet compound to 56 wt % water, merely by way of example. Some embodiments may involve creating a wet compound with different water percentages.

The net enthalpy of this reaction at 1000° C. output temperature may be 3854 kJ/mol.

However, when the hydrogen burn is considered, the following energy may be released:

$$\Delta H = 44(-241.8) = -10,640 \text{ kJ/mole}.$$

The net energy generation may be 10640−3854=6786 kJ/mole xylan. For each gram of xylan consumed the following energy may be released:

$$\Delta H = 6786 \text{ kJ}/368 \text{ g xylan}$$
$$= 18.44 \text{ kJ/g xylan}.$$

The net thermal energy released by burning the hydrogen produced from xylan via the CHyP reaction may be described as:

(18.44 kJ/g)(1,000,000 g/tonne)(1 MW-hr/3,600,000 kJ)=5.12 MW-hr/tonne.

Hydrogen from Glucomannon

The chemical formula for glucomannan may be described as $C_{35}H_{49}O_{29}$ and the reaction driven by some embodiments may be described as:

$$C_{35}H_{49}O_{29} + 41H_2O = 35CO_2 + 65.5H_2.$$

This corresponds to adding enough water to the glucomannan to bring the composition of the wet compound to 44.13 wt % water, merely by way of example. Some embodiments may involve creating a wet compound with different water percentages.

The net enthalpy of this reaction at 1000° C. output temperature may be 6885 kJ/mol.

However, when the hydrogen burn is considered, the following energy may be released:

$$\Delta H = 65.5(-241.8) = -15,840 \text{ kJ/mole}.$$

The net energy generation may be 15,840−6885=8955 kJ/mole glucomannan. For each gram of glucomannan consumed the following energy may be released:

$$\Delta H = 8955 \text{ kJ}/933 \text{ g glucomannan}$$
$$= 9.6 \text{ kJ/g glucomannan}$$

The net thermal energy released by burning the hydrogen produced from glucomannan via the CHyP reaction may be:

(9.6 kJ/g)(1,000,000 g/tonne)(1 MW-hr/3,600,000 kJ)=2.67 MW-hr/tonne.

The following table provides, merely by way of example, hydrogen and energy yields from biomass feedstock by biochemical component:

| Biochemical Component | Grams water required per gram component | Input Reaction Energy Required (kJ/g component) | $H_2$ Yield (g $H_2$ per gram component) | Gross Energy Yield (kJ/g component) | Net Energy Yield (kJ/g component) | Comments |
|---|---|---|---|---|---|---|
| Cellulose | 0.79 | 7.66 | 0.148 | 17.91 | 10.25 | More in hardwoods |
| Lignin | [18(16 + n)]/[150 + 31n] (=1.69, n = 1) | [2008 − 35nn)]/[150 + 31n] (=10.9, n = 1) | [21 + 2.5n]/[150 + 31n] (=0.13, n = 1) | 5078 + 605n / 150 + 31n (=31.4, n = 1) | 3070 + 640n / 150 + 31n (=20.5, n = 1) | 0.9 < n < 1.4 depending on feedstock |
| Xylan | 1.27 | 10.47 | 0.239 | 28.91 | 18.44 | More in hardwoods |
| Glucomannan | 0.79 | 7.38 | 0.140 | 10.63 | 9.6 | Mostly in softwoods |

For some embodiments, an expression of expected hydrogen yields for an input lignocellulosic biomass feedstock of C % cellulose, L % lignin, X % xylan, and G % glucomannan may be determined using the following equation:

Mass ($H_2$)={0.148C+[(21+2.5n)/(150+31n)]L+ 0.239X+0.14G}Mass (dry feedstock).

For hybrid poplar, merely by way of example, with C=0.47, L=0.3, X=0.18, G=0.05 and n=1.3, $$\text{Mass}(H_2) = 0.148(.47) + 0.127(.3) + .239(.18) + .14(.05)$$
$$= 0.158 \text{ Mass(dry feedstock)}$$

$$\text{Net energy yield} = 10.25(.47) + 20.5(.3) + 18.44(.18) + 9.6(.05)$$
$$= 14.77 \text{ kJ/gram of dry feedstock}.$$

For Alamo switchgrass, merely by way of example, with C=0.41, L=0.27, X=0.27, G=0.05 and n=1, $$\text{Mass}(H_2) = 0.148(.41) + 0.13(.27) + .239(.27) + .14(.05)$$
$$= 0.167 \text{ Mass(dry feedstock)}$$

$$\text{Net energy yield} = 10.25(.41) + 20.5(.27) + 18.94(.27) + 9.6(.05)$$
$$= 15.33 \text{ kJ/gram of dry feedstock}.$$

Systems for Extraction of Hydrogen from C—O—H Compounds and Conversion into Electrical Power or Heat Generation Energy production from biomass generally takes one of three approaches: direct combustion of biomass for heat and/or electricity generation, pyrolytic gasification of biomass for combustion for heat and/or electricity production, or conversion of biomass into liquid fuels for future combustion. Many of these approaches start with the production of a synthesis gas, and some use the water shift reaction to enhance the reaction, particularly for the production of liquid fuels.

Because many of these technologies are well-established, there is a large body of literature regarding work completed and actively being pursued in this area. A report prepared by the Department of Energy written in 2002 titled, "Benchmarking Biomass Gasification Technologies for Fuels, Chemicals and Hydrogen Production" listed 15 of the units in use at that time. All of the processes use pyrolytic syngas systems although there are variations to the approach. They all utilize a process that results in a gas stream that generates from 4% hydrogen to 43.3% hydrogen, with the average gas stream being 15.2% hydrogen.

Indeed, the economics of biomass are sufficiently favorable such that 11 GW of electrical generation is currently utilized in the U.S. However, the bulk of that installed capacity utilizes steam generation and the average biomass plant is 20 MW with about 20% (what-to-what) efficiency. The operations are trending toward larger plant size to increase the efficiencies.

The NREL report "Highlights of the Biopower Assessment: State of the Industry and the Technology" also discusses the state of the biomass industry and in their examples comparing direct combustion versus gasification shows gasification to be 36% efficient versus direct combustion at 30% efficiency.

In addition there are several research teams that are trying to extract hydrogen from cellulose. These efforts are based around (a) microbial digestion and (b) the use of NaOH and a catalyst to facilitate a reaction that releases hydrogen and captures the carbon as sodium carbonate. More extensive efforts are being expended in several pilot facilities, to process the cellulose into ethanol.

Many companies in the food processing, wood processing, and paper processing sectors have significant byproducts of their processes which have little or negative value to their main enterprise. At the same time, electrical power costs to the industrial sector are rising at 5% per year, and with looming carbon dioxide emissions regulations, these rates promise to grow even more quickly in the coming decade. Many of the processing byproducts have to be disposed of in some manner, generating tipping fees or other disposal expenses.

Options available for distributed generation to alleviate facility energy costs are often not economical enough to significantly impact the energy budget of a facility, or to make an impact on waste stream reduction. In some cases, direct combustion of waste products is used to generate heat and steam for processes, but no generally economical renewable energy electrical generation options are available. Electricity from photovoltaics costs about $200/MWh after application of the 30% federal investment tax credit, and using diesel generators for combined-heat-and-power systems exposes the companies to fuel price fluctuations for diesel fuel, and promotes national energy dependency. The most economical systems are combined-heat-and-power (CHP) systems fueled by natural gas, and these are most common in large institutional buildings such as universities, schools, and hospitals. For commercial and industrial settings, the ability to generate electricity economically separately from process heat requirements would open significant market opportunities.

In accordance with various embodiments, a two-step process for the conversion of cellulosic biomass to hydrogen may be involved. Some embodiments include a novel type of hydrous pyrolysis process that differs from prior art processes common in scientific literature or available commercially. In one aspect, the process may be applicable to most of the components of the cellulosic biomass, including the cellulose, hemi-cellulose and lignin portions.

The clean energy system developed for this process may involve a gasifier useful for customer-sited distributed generation. The system may convert cellulosic biomass to a hydrogen-rich gas stream that can be directly combusted to produce heat and/or power. Ranging in power from 500 kW to 5 MW, merely by way of example, these systems may be sold to business customers with cellulosic biomass waste streams such as woody waste, agricultural byproducts, and paper waste. Other customers may include, but are not limited to, community-scale independent power producers, and institutions seeking affordable on-site renewable energy options.

An operating prototype of a gasifier in accordance with various embodiments may generate continuous output streams of hydrogen from multiple cellulose sources at rates up to 450 $kW_{th}$ (thermal) for an input pyrolysis power of only 12 kW, merely by way of example. The gas mixture produced may contain 65% hydrogen, 30% carbon dioxide, and 5% other components and the prototype directly feeds an electrical generator running at 9 $kW_e$ (electrical). The gas produced by the system may be higher in energy content than other pyrolysis gases, and the process is carbon-neutral with water vapor as the primary emissions component.

FIG. 1 provides a system diagram showing the several stages that may be involved from providing a feed stock to final production of electrical generation, merely by way of example. Embodiments may involve a pyrolysis system (Cellulosic biomass to Hydrogen Pyrolysis system, or CHyP system) that may generate a hydrogen-rich gas stream from biomass as needed for power and heat generation. The measured composition of the gas stream (65% hydrogen, 30% carbon dioxide, and 5% ash, tars, and hydrocarbons) may be ideal for combustion in reciprocating engines for power generation. This gas stream may be evolved in a single process step from mechanically and chemically prepared cellulosic waste or biomass, and after removing the ash and tars the gas is fed into an internal combustion (IC) engine. The presence of $CO_2$ in the gas stream may be quite beneficial for this application, as it may act as a buffer gas, keeping temperatures in their specified range for IC engines. If the gas stream had more combustible elements than this, the resulting temperatures in the engine would rise to levels that would generate elevated $NO_x$ emissions and reduce the lifetime of the engine.

Figure 2:
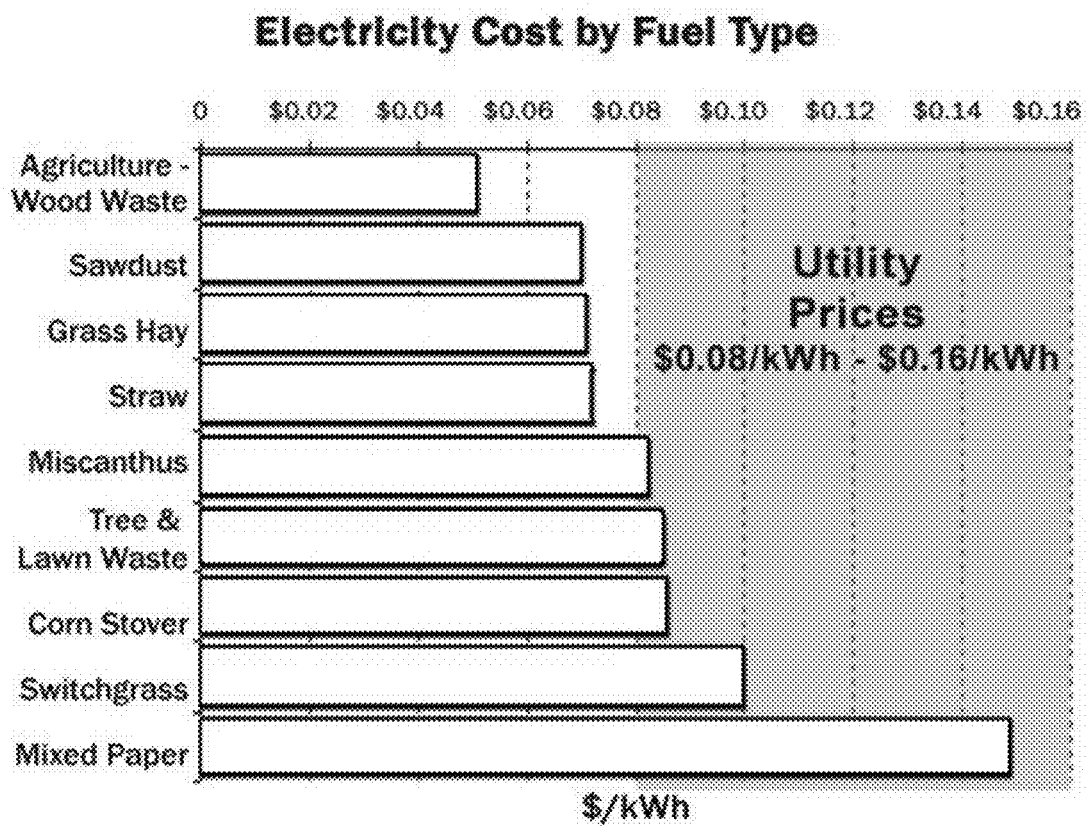
FIG. 2 provides a cost comparison between different means of hydrogen production in accordance with various embodiments.

FIG. 2 provides a cost comparison between different means of hydrogen production. The efficiency of the CHyP gasifier may produce excellent energy economics. The process allows the production of hydrogen at the feedstock cost rate of $0.75/kg, merely by way of example. For comparison, hydrogen may have 92% of the energy content of a gallon of gasoline allowing some direct comparisons with fossil fuels. On a heat basis, the hydrogen derived from cellulosic biomass gasification may be equivalent to wholesale gasoline priced at $0.82/gallon. Heat from the same process can be produced for about $0.51/therm compared with about $0.60/therm for wholesale natural gas and $0.85/therm for wholesale propane, merely by way of example. Electricity (requiring a generator) can be produced for approximately between $0.03/kWh and $0.07/kWh.

An important aspect unique to some embodiments may be the ability to generate hydrogen from a feedstock at small scales (500 kW to 5 MW, for example) for distributed applications. Most other cellulose or biomass generation approaches can operate economically only at large scales. The ability to operate at any scale may address applications not available to current approaches. The potential market opportunities may include, but are not limited to: Residential: heat, electricity, or combined heat and power (CHP) systems; Merchant Power: electricity or district CHP; Hydrogen Supply: hydrogen gas; Industrial: heat, electricity, or CHP; Commercial: heat, electricity, or CHP.

Embodiments may include a simplified design that may favor scalability from distributed generation scales to commercial power production. Because of the exothermic nature of the overall process, the leverage of thermal power out from the input power may be over a factor of 20 from prior art gasification technologies that have focused on the thermal issues resulting in heat losses. Increased flexibility of input biomass sections may result from the process and equipment being tolerant to water. A beneficial byproduct of the process and equipment may be the minimization of the emission of tars. With on-site hydrogen generation, the benefits of hydrogen may be realized without the difficulties of storage and distribution issues in some embodiments. Because the CHyP syngas may contain 30% $CO_2$, the dilution of the $H_2$ may result in combustion temperatures suitable for existing internal combustion engines, keeping the $NO_x$ emissions within acceptable limits and not degrading engine components.

The process and pyrolysis unit of some embodiments may produce a hydrogen syngas that may be used to supply a hydrogen mix to an application as the gas is ready to consume. The hydrogen syngas can be burned in internal combustion engines to generate heat or electricity. This electrical generation application may be used to provide the electrical power from cellulosic biomass such as switchgrass for the integrated biorefinery operations, improving the embedded emissions balance of the resulting fuels. The electricity produced may be either used in the biorefinery plant or metered back to the grid in an amount at least equivalent to that utilized by all of the operations in the integrated biorefinery, merely by way of example. Because the hydrogen may be generated as needed, no hydrogen storage may be required for some embodiments and consequently no high pressure hydrogen storage concerns.

Some embodiments may include a condenser at the end of the CHyP hydrogen generator to capture any excess water and tars, some embodiments may utilize this design to generate liquid fuels. Some embodiments may be capable of producing alcohols where the reactions may be controlled to produce the alcohol of choice. Several attractive features of the process resulted in the decision to pursue development of liquid fuels from the extracted hydrogen, described in U.S. patent application Ser. No. 61/221,750 entitled "Method for Making Liquid Fuel from Cellulose in Thermal Reactor" and shown in FIG. 3A with the power generation from hydrogen extraction process and gasifier described herein, incorporated herein for all purposes.

Figure 3A:
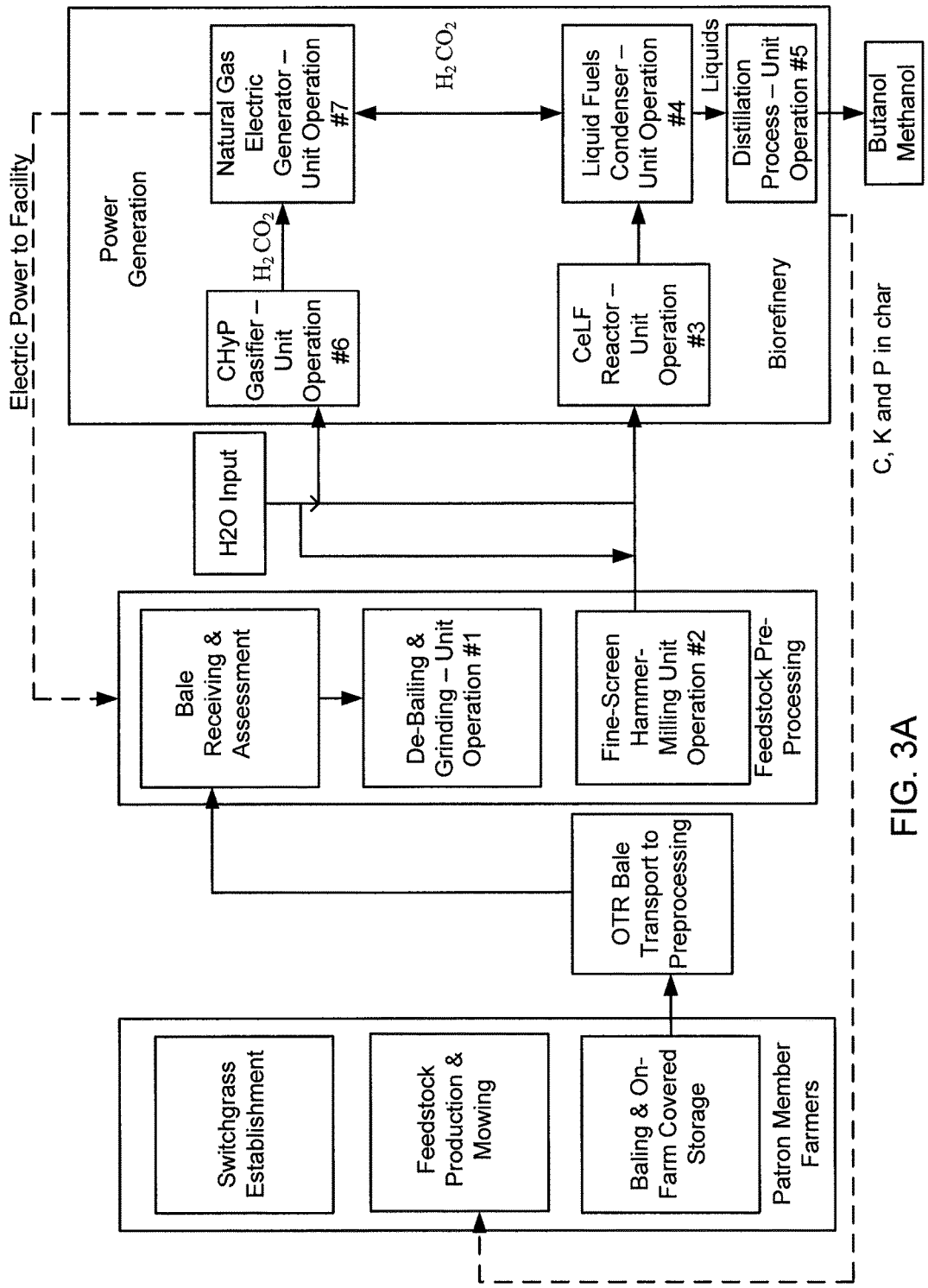
FIG. 3A shows a process of producing liquid fuels and/or power from the extracted hydrogen in accordance with various embodiments.
Figure 3B:
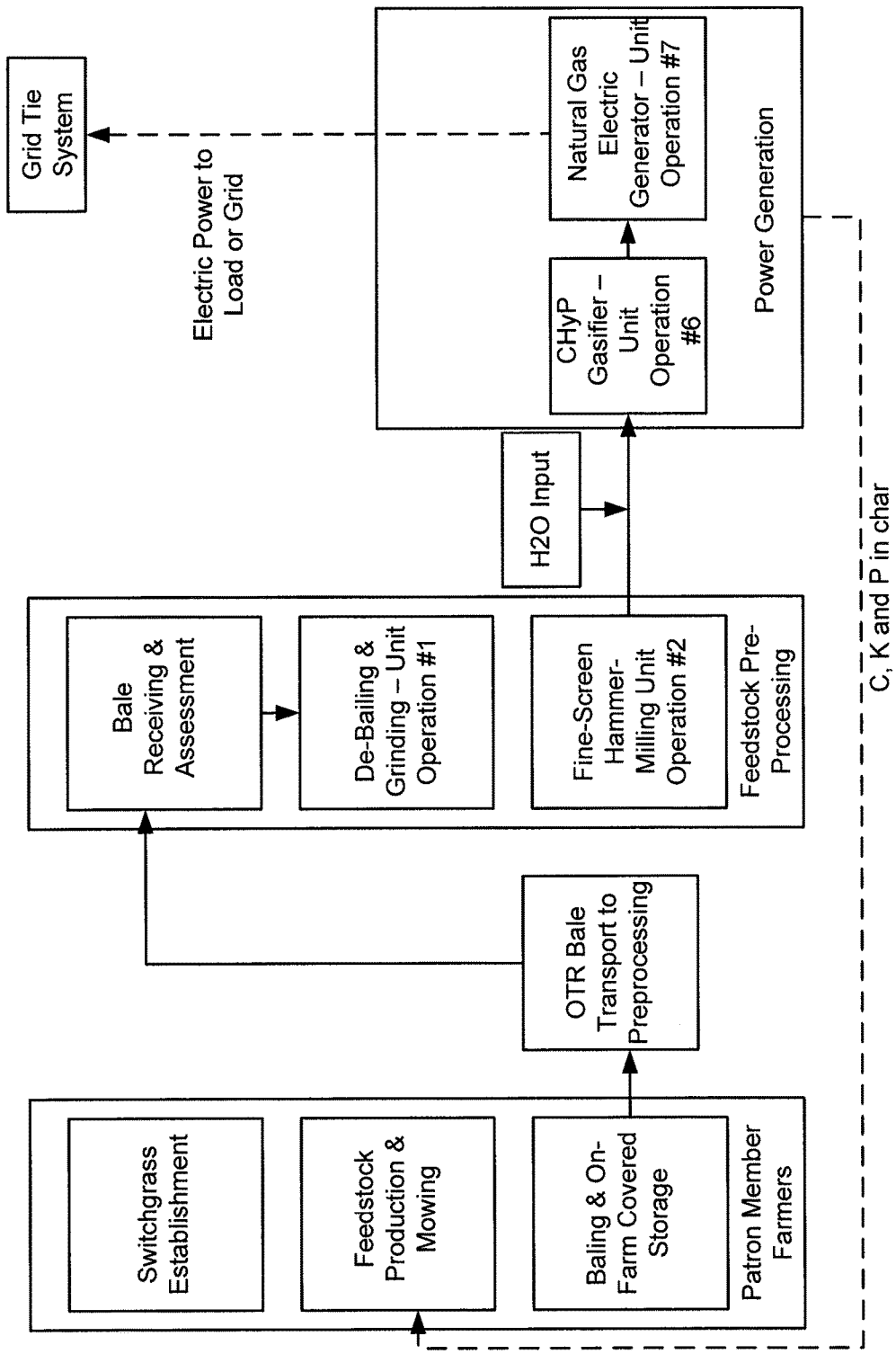
FIG. 3B shows a process of producing power from extracted hydrogen in accordance with various embodiments.

Merely by way of example, FIG. 3A shows a process flow diagram for a switchgrass-to-butanol biorefinery project showing the cyclic flow of material from farm to feedstock processing, through liquids production, distillation, and shipping. Included in the process flow are return flows of biochar to farm fields as a soil amendment and carbon sequestration, as well as production of on-site electricity derived from biomass to operate the facilities. FIG. 3B shows a similar process flow diagram for a simpler system that is focused on power production.

A principal attractive feature of some embodiments that include hydrogen extraction approach may be that the simplicity of gasifier design and a process which is continuous, allows for reproducible results, and may be easily scalable. In addition, prior developments on the CHyP process and apparatus have resulted in well-engineered feed rate technology that would enhance the quality and reproducibility of results. Sizing and milling processes for the feedstock may be initially utilized to produce prepared feedstocks for the CHyP converter but the developed processes may be translated well for use in the Cellulosic biomass to Liquid Fuel (CeLF) reactors.

Figure 4A:
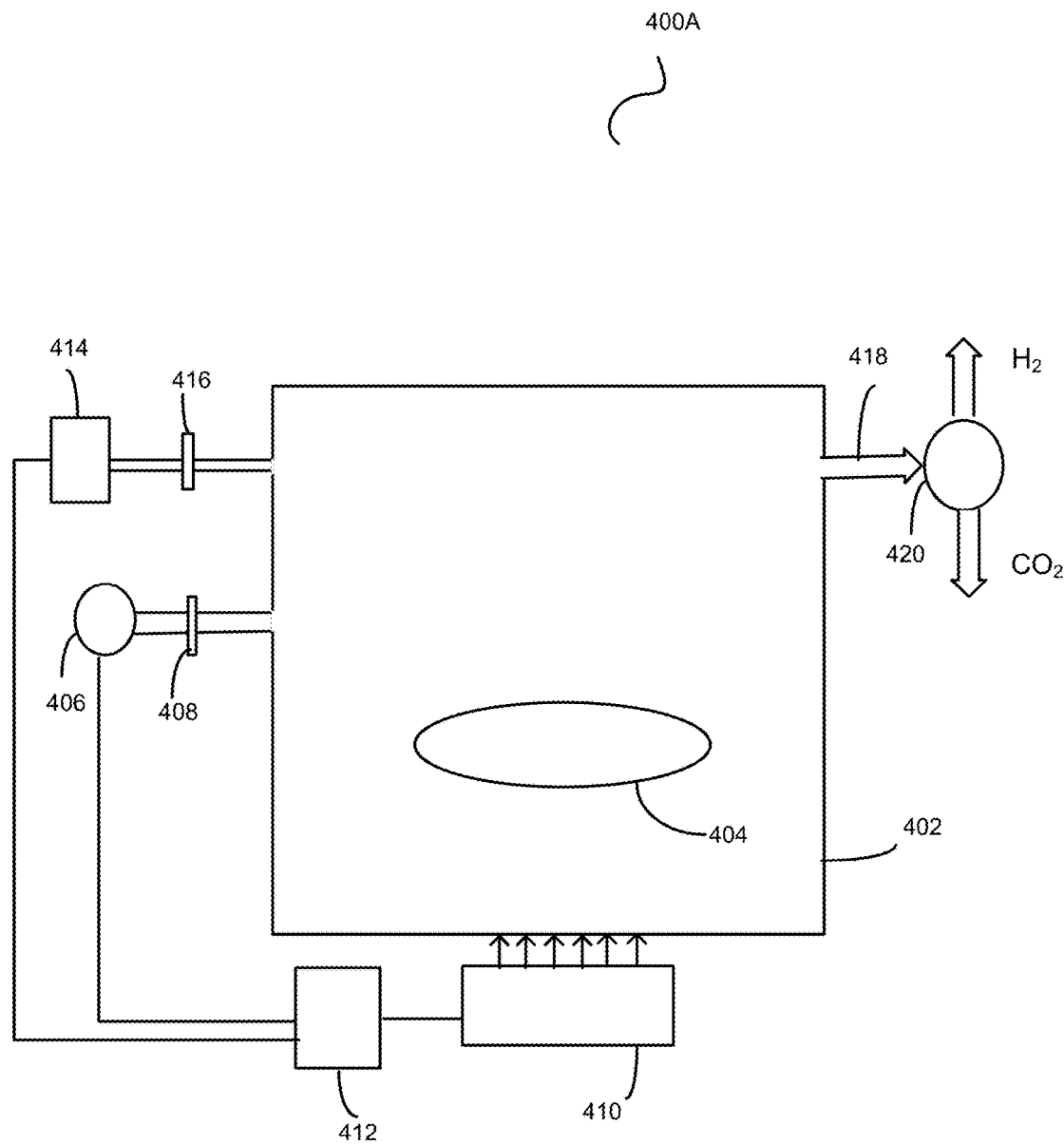
FIG. 4A is a schematic diagram of a simplified system for conversion of C—O—H compounds into hydrogen in accordance with various embodiments.

A general overview of a simplified system 400A for conversion of a C—O—H compound into hydrogen in accordance with various embodiments is provided with FIG. 4A. The system 400A comprises a chamber 402, a heating system 410 in a thermal communication with the chamber 402, an optional gas supply line 414 for providing inert gas into the chamber 402, a water supply line 406 for water to be added to the chamber 402 by using valve 408, an exhaust line 418 to allow the product gases (such as $H_2$ and $CO_2$, depending on the specific compound(s) used) to exit the chamber 402 to flow into an optional gas separator 420, and a controller 412. The C—O—H compound 404 is disposed within the chamber 402. Examples of C—O—H compounds that may be found suitable for methods in accordance with various embodiments include, but are not limited to, sources of cellulose, hemicellulose, and/or sources of lignin. As described further below, some processes may use an inert gas, and the controller 412 controls when to continuously purge chamber 402 with inert gas by using a valve 416. The controller 412 may also control the heating system 410 to provide the elevated temperatures that the chamber needs to cause the C—O—H compound 404 to be dissociated in the environment within the chamber 402. The controller 412 may also control the rate of speed of the insertion of wetted feedstock into the chamber 402. The controller 412 may further control the temperature of the heating system 410 to convert the water in the wetted feedstock into water vapor and to heat the C—O—H compound 404 to cause the chemical reaction of the C—O—H compound 404 with water. The gas separator 420 may be used to separate the products of the reaction (e.g., $H_2$ and $CO_2$ gases and perhaps other reaction products) after the gases ($H_2$, $CO_2$) exit the chamber 402. The hydrogen gas can then be further used to generate electrical power or heat by different systems, or can be packaged for sales and distribution as a purified gas. In a specific embodiment, the gas supply line 414 for providing inert gas is not present. In such a case, trace amounts of entrained air in the wetted feedstock being inserted into the chamber 402 may react with the C—O—H compound to produce water and carbon dioxide.

Technique for hydrogen burning to generate power and/or heat are known in the art. The entire contents of a U.S. Pat. No. 7,144,826 B2, entitled "Method and Apparatus for the Production of Process Gas That includes Water Vapor and Hydrogen Formed by Burning Oxygen in a Hydrogen-Rich Environment" by George Roters, Helmut Sommer, Genrih Erlikh, and Yehuda Pashut, are incorporated herein by reference for all purposes.

Figure 4B:
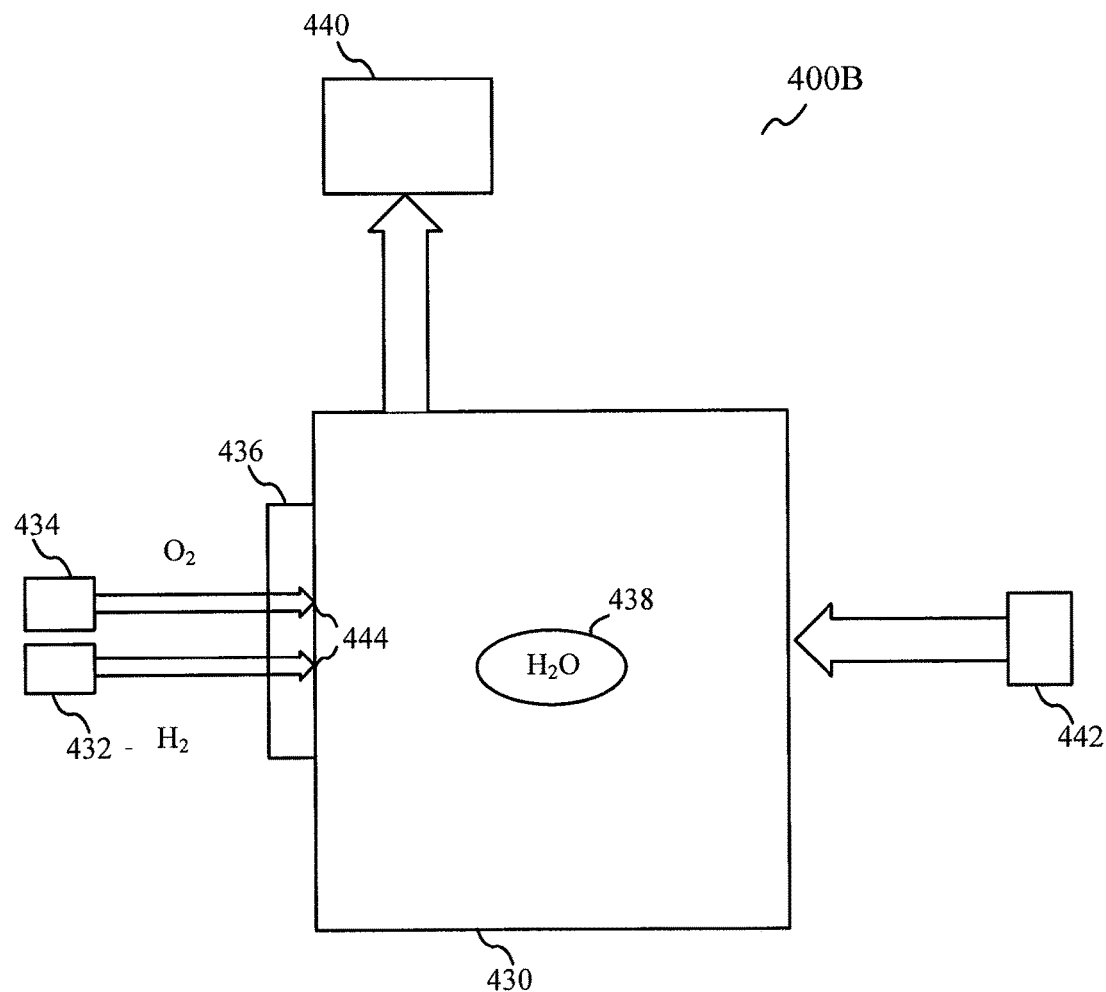
FIG. 4B is a schematic diagram of a simplified system for hydrogen to be burned in a combustion chamber in accordance with various embodiments.

For illustration purposes, a simplified exemplary system 400B for hydrogen burn is provided in FIG. 4B. The system 400B comprises a combustion chamber 430, a burner 436 for igniting hydrogen burning in oxygen to form water vapor 438 and generate heat, a $H_2$ gas supply line for providing $H_2$ into the combustion chamber 430, a gas supply line for providing $O_2$ or air into the combustion chamber 430, an exhaust line 440 for water vapor steam 438 to exit the combustion chamber 430, and an inert gas supply line 442 for providing inert gas to flush the combustion chamber prior to introducing H₂ gas to the combustion chamber 430 in embodiments where such inert gas is used. The ratio of hydrogen gas 432 and oxygen gas 434 may be provided such that hydrogen may be thoroughly burned in oxygen. The water vapor 438 may be converted into electrical power in the converter 440 by any of several techniques known in the art. In general, instead of oxygen, an oxygen-containing gas, such as, among others, NO or O₃, can be used, merely by way of example. As noted, in specific embodiments, the gas supply line 442 for providing inert gas is not present. In such a case, air inside the chamber 430 may react with the C—O—H compound to produce water and carbon dioxide until the air is depleted.

After the combustion chamber is filled with hydrogen 432, the heating system 436 may be activated and now oxygen 434 may be introduced into the chamber. In the combustion chamber 430, the oxygen 434 may be introduced, for example, with a time delay of five seconds relative to hydrogen 432. The heating system 436 may heat the region near the outlet 444 to about 700° C. to ignite the combustion, merely by way of example. The ratio of the oxygen 434 to the hydrogen 432 may be provided into the combustion chamber so that the hydrogen is completely burned.

Another method of conversion of hydrogen into electrical power is using a fuel cell. A fuel cell is an electrochemical energy conversion device. It transforms chemical power into electrical power. A fuel cell can convert hydrogen and oxygen into water and produce electricity and heat. A fuel cell can also use other fuel sources than hydrogen gas, such as liquid fuel like methanol, natural gas, gasoline, and the like. A fuel cell power generation equipment comprises an anode, an electrolyte membrane, a cathode and a diffusion layer, wherein fuel is oxidized at an anode and oxygen is reduced at a cathode, such as described in U.S. Pat. No. 7,192,666 B2, entitled "Apparatus and Method for Heating Fuel Cells" by John C. Calhoon, the entire contents of which are incorporated herein by reference for all purposes.

Figure 4C:
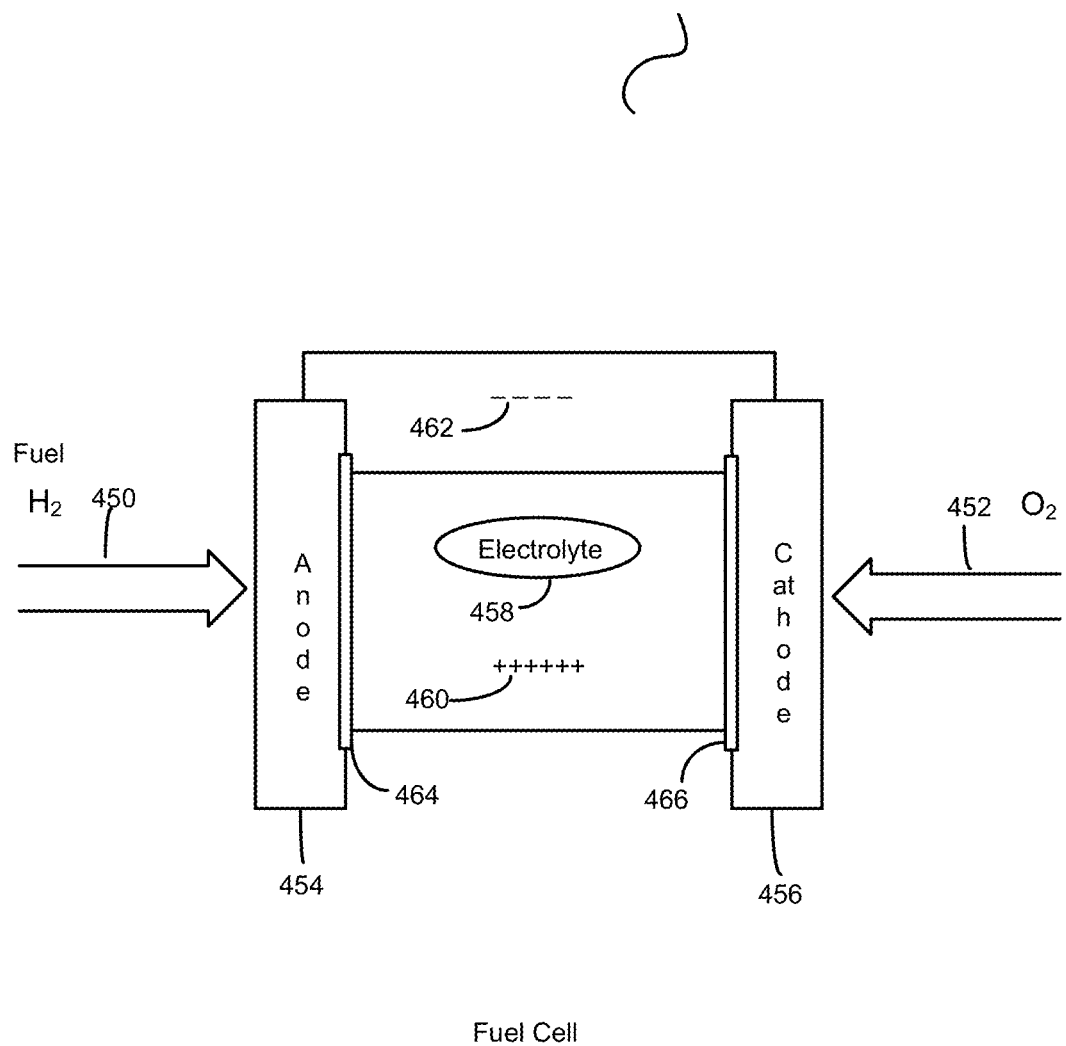
FIG. 4C is a schematic diagram of a simplified system for conversion of hydrogen gas into electrical power by a fuel cell in accordance with various embodiments.

FIG. 4C shows a simplified fuel cell system 400C for using H₂ gas as fuel. The system 400C comprises an anode 454, and a cathode 456, an electrolyte 458, a hydrogen gas 450 supply line, and an oxygen gas 452 supply line. Hydrogen 450 from the gas supply line may be fed to the anode 454 of the fuel cell, while oxygen 452 from the gas supply line may be fed to the cathode 456 of the fuel cell. The hydrogen 400 atoms, reacting with a catalyst 464 in the anode 454, are split into protons 460 and electrons 462. Meanwhile, an oxygen molecule 452, reacting with a catalyst 466 in the cathode 456, is split into two separate oxygen atoms bearing negative charges.

The electrolyte 458 is positioned between the anode 454 and the cathode 456. The electrolyte 458 functions as a conductor for carrying protons 460 between the anode 454 and the cathode 456. The protons 460 are permitted to pass through the electrolyte while the electrons 462 are not. The protons 460 pass through the electrolyte 458 towards the oxygen 452 in the cathode 456. The result is a build up of negative charge in the anode 454 due to the electrons 462 that are left behind. The electrical potential generated by the buildup of electrons 462 is used to supply electrical power. Meanwhile, the protons diffuse through the membrane (electrolyte) to the cathode, where a hydrogen atom is recombined at the cathode and reacted with oxygen to form water at the cathode.

There are many types of fuel cells for converting hydrogen and oxygen into water and generating electricity, for instance, among others, phosphoric acid fuel cell (PAFC), Proton Exchange Membrane (PEM), Molten Carnoate Fuel Cell (MCFC), Solid Oxide Fuel Cell (SOFC), and Alkaline Fuel Cell (AFC). The efficiencies vary from various fuel cells, ranging from 30% to 85%, merely by way of example.

The chemical reactions also vary from fuel cells. For example, the chemical equations for describing the PEM reactions in the anode, cathode, and the fuel cell may be provided as follows:

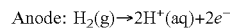
Anode: $H_2(g) \rightarrow 2H^+(aq) + 2e^-$

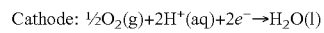
Cathode: $\frac{1}{2}O_2(g) + 2H^+(aq) + 2e^- \rightarrow H_2O(l)$

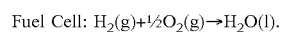
Fuel Cell: $H_2(g) + \frac{1}{2}O_2(g) \rightarrow H_2O(l)$.

Another example of the chemical reactions for describing the PAFC reactions is provided below:

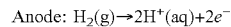
Anode: $H_2(g) \rightarrow 2H^+(aq) + 2e^-$

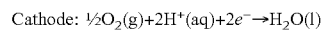
Cathode: $\frac{1}{2}O_2(g) + 2H^+(aq) + 2e^- \rightarrow H_2O(l)$

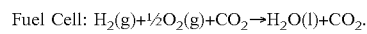
Fuel Cell: $H_2(g) + \frac{1}{2}O_2(g) + CO_2 \rightarrow H_2O(l) + CO_2$.

Note that PAFCs can tolerate a low concentration of CO₂ of about 1.5%, which allows a broad selection of acceptable hydrogen fuels.

Processes for Conversion of Hydrogen into Electrical Power

Systems and processes in accordance with various embodiments for extracting hydrogen and converting that hydrogen into electrical power may address many of the issues identified as problems in the gasification space. A simplified system design may allow scalability over a very wide range from home unit size to commercial power production. The process may focus on thermal issues causing heat losses that tend to make gasification technologies inefficient. Although the process may produce excess heat, heat losses to the environment and through the exiting gases may be accounted for. Because of the exothermic nature, the leverage of thermal power out from the input power may be over 20.

Figure 5:
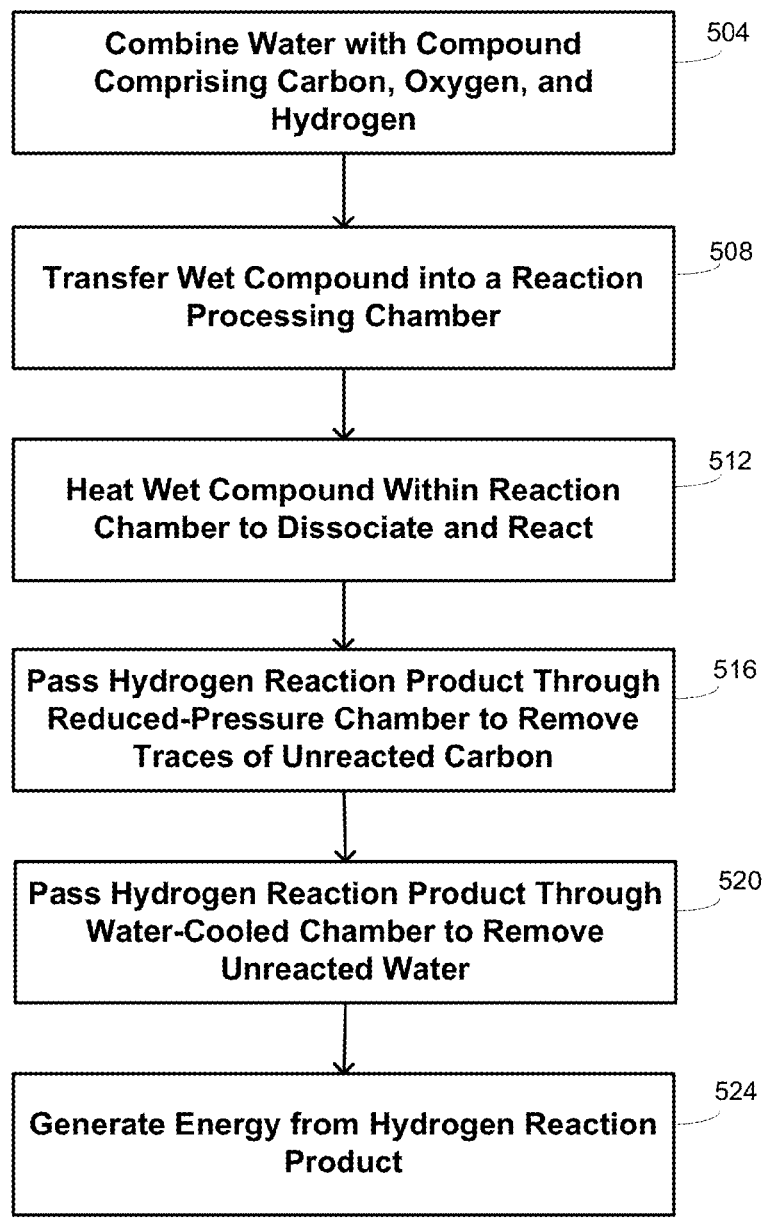
FIG. 5 is a flow diagram that summarizes general aspects of methods for converting C—O—H compounds into hydrogen for power generation in accordance with various embodiments.

FIG. 5 provides an overview of methods in accordance with various embodiments that may be used for conversion of the C—O—H compound into hydrogen for power generation. In FIG. 5 and in the other flow diagrams, the specific selection of steps shown and the order in which they are shown are intended merely to be illustrative. It is possible for certain steps to be performed in alternative orders, for certain steps to be omitted, and for certain additional steps to be added according to different embodiments of the invention. Some but not all of these variants are noted in the description that follows.

At block 504 of FIG. 5, water may be combined with the C—O—H compound, examples of which include cellulose, hemicellulose and/or lignin. The wet compound is transferred into a reaction processing chamber at block 508. These two steps provide one example of steps whose order may be changed in alternative embodiments. For example, the compound may be disposed in the reaction processing chamber in a dry state, with the "transfer" effected by combining it with water while disposed there. In still other instances, water may be applied to the compound as it is moved into the reaction processing chamber, such as by using a spray system, as part of the transfer.

At block 512, the wet compound is heated within the reaction chamber. Such heating may be accomplished using a variety of different techniques known to those of skill in the art, some of which have been described above for specific structural embodiments. In some instances, the compound may be heated to a temperature between 700° C. and 1100° C. although other temperatures are known by the inventors also to be effective. Heating the wet compound may cause dissociation and reaction of the dissociated elements, with typical reaction products including molecular hydrogen $H_2$ and carbon dioxide $CO_2$. Molecular hydrogen produced within the reaction chamber may be processed at blocks 516-524, although not all of these steps need be included in many embodiments.

In particular, it is not expected that the production of hydrogen will be 100% and there may be traces of unreacted elements remaining in the reaction products. For example, passing the hydrogen reaction product through a reduced-pressure chamber at block 516 may be useful in removing traces of unreacted carbon and passing the hydrogen reaction product through a water-cooled chamber at block 520 may be useful in removing unreacted water and tars.

Once the hydrogen has been extracted from the process, it may be processed at block 524 to generate energy, such as by using a burning process, a reciprocating engine or a fuel-cell process as described above.

Figure 6:
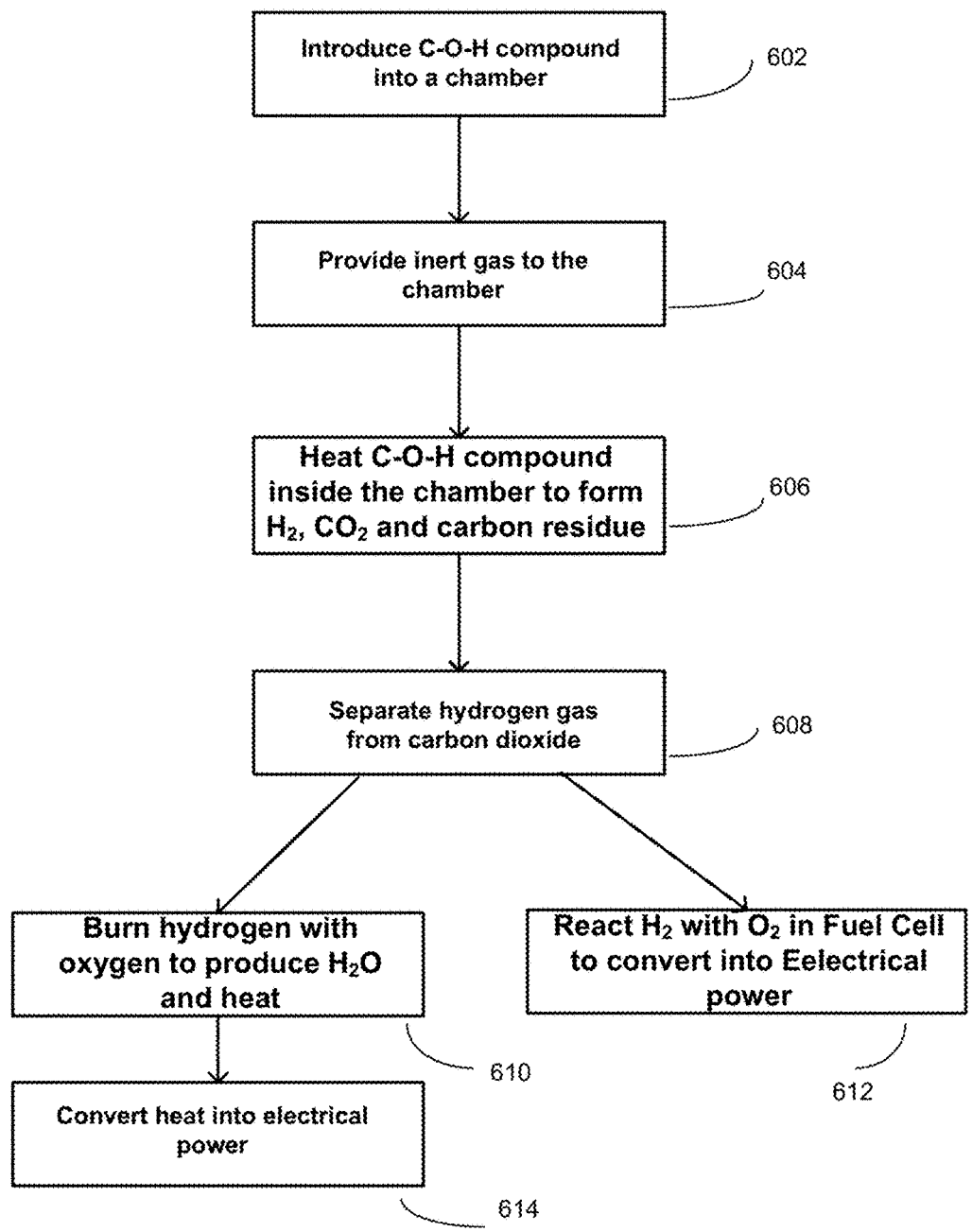
FIG. 6 is a flow diagram that summarizes a first specific method of extraction of hydrogen from cellulosic biomass and steps of conversion of hydrogen into electrical power in accordance with various embodiments.
Figure 7:
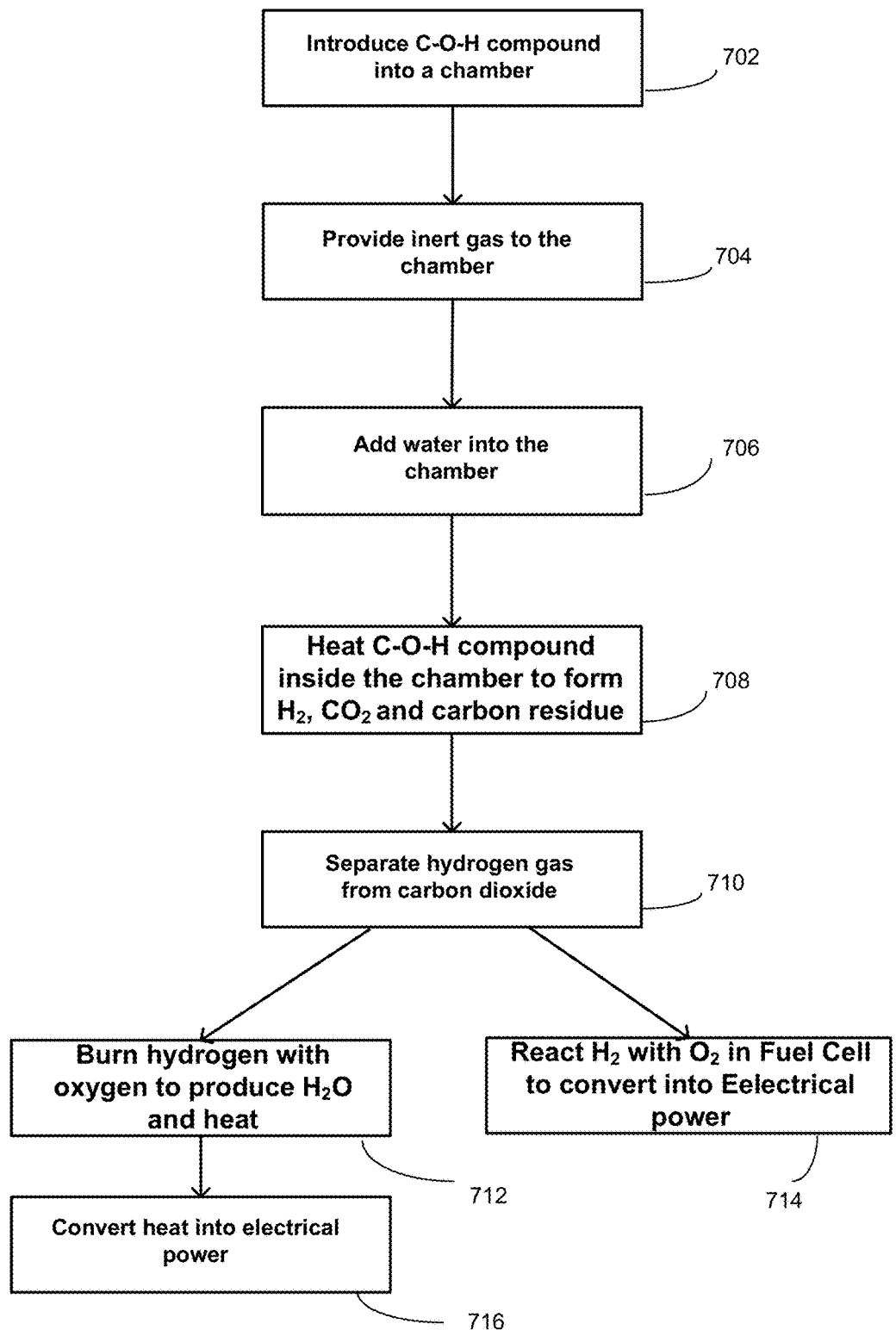
FIG. 7 is a flow diagram that summarizes a second specific method of extraction of hydrogen from cellulosic biomass and steps of conversion of hydrogen into electrical power in accordance with various embodiments.

FIGS. 6 and 7 provide more specific illustrations of methods of the invention for particular embodiments. For example, FIG. 6 is a flow diagram that summarizes a first method of conversion of a source of C—O—H compound such as cellulose, hemicellulose, and/or lignin into hydrogen from reaction 1a and then steps for conversion of hydrogen into electrical power. The process starts at block 602 by introducing the source of C—O—H compound into a chamber. The chamber may then be flushed with inert gas to displace air in the chamber at block 604. The inert gas may comprise argon, nitrogen, helium, and the like. In a specific embodiment of the invention, no inert gas is introduced into the chamber so that the chamber is filled with air. In a specific embodiment, the wetted cellulosic feedstock is continuously moved through the heating chamber, and no inert gas is used, and the geometry of the chamber minimizes the presence of air in the chamber. The air may react with the C—O—H compound until the air is depleted inside the chamber. The chamber containing the source of C—O—H compound may be heated to cause dissociation of the C—O—H compound at block 606. The dissociation may result in forming hydrogen gas, carbon dioxide, carbon monoxide, other hydrocarbons, and carbon residue. The hydrogen gas may be separated from the carbon dioxide gas at block 608 by techniques known in the art. The diagram shows two possible ways of conversion of hydrogen into electrical power, though other ways may be utilized. One way of conversion of hydrogen into electricity is to react hydrogen with oxygen in a fuel cell at block 612. Another way of conversion of hydrogen into electrical power is to burn hydrogen gas in oxygen in a combustion chamber at block 610, so that water vapor is formed along with heat release. The water vapor may then be fed into an energy converter such as an expansion turbine for producing electricity from thermal energy at block 614 by techniques known in the art.

FIG. 7 is a flow diagram that summarizes a second method of conversion of a source of C—O—H compound into hydrogen from reaction 2a and steps for conversion of hydrogen into electrical power. The process starts at block 702 by introducing the source of C—O—H compound into a chamber. The chamber may then be flushed with inert gas to displace air in the chamber at block 704. The inert gas may comprise argon, nitrogen, helium, and the like. In a specific embodiment, no inert gas is introduced into the chamber so that the chamber is filled with air. The air reacts with cellulose, hemicellulose, and/or lignin until the air may be depleted inside the chamber.

Water may then be added into the chamber at block 706, as water may be needed to react with the C—O—H compound to form hydrogen and carbon dioxide. The water in the form of liquid may be heated to be changed to water vapor, and the chamber containing the source of C—O—H compound is heated to a temperature at which the C—O—H compound may react with the water vapor at block 708. In a specific embodiment, the wetted cellulosic feedstock is continuously moved through the heating chamber, and no inert gas is used, and the geometry of the chamber minimizes the presence of air in the chamber. The reaction of C—O—H compound and water results in forming a hydrogen gas and a carbon dioxide gas. The hydrogen gas needs to be separated from the carbon dioxide gas at block 710 by techniques known in the art.

The diagram shows two possible ways of conversion of hydrogen into electrical power, though other ways may be also utilized. One way of conversion of hydrogen into electricity is to react hydrogen with oxygen in a fuel cell at bock 714. Another way of conversion of hydrogen into electrical power is to burn hydrogen gas in oxygen in a combustion chamber at block 712, so that water vapor is formed along with heat release. The water vapor may then be fed into an energy converter for producing electricity from thermal energy at block 716 by techniques known in the art.

The cellulose reactions 2a and 2b may have several unique features for automotive applications. First of all, by utilizing the waste heat from the engine to heat up the reaction chamber for hydrogen production, it may potentially recapture the energy of 487 kJ/mol that is the heat used to form water vapor at 400° C. and to heat cellulose as discussed above. This may improve the energy output by 17% that is equal to (487 kJ/mol)/(2902 kJ/mol).

Furthermore, the water vapor generated from hydrogen burn in reaction 2b may be re-circulated into the hydrogen generation chamber so that the water usage would only be the initial one to start the cellulose process. As shown in reactions 2a and 2b, 12 moles of water are released from each mole of cellulose converted. If the water from reaction 2b is reused without any loss, 5 net moles of water are created from cellulose in reactions 2a and 2b, merely by way of example. By proper use and capture of the generated water from Reaction 2b, no net water may be needed in sustaining the cellulose reaction process. This may eliminate an initial concern that the weight of 126 g (7 moles) of water for 162 g (1 mole) of cellulose in Reaction 2a would be an additional burden to the automobiles.

Additionally, the system for conversion of cellulose into hydrogen for power generation may reduce the production of carbon dioxide generation, when compared to the use of gasoline. This may help with easing the concern of global warming issue. For 1 mile per kW-hr as discussed earlier on, the carbon dioxide release in reaction 2a for one mole of cellulose may be estimated by:

$$(6 \times 44 \text{ g } CO_2)/(12 \times 2 \text{ g } H_2) = 11 \text{ g } CO_2/gH_2$$

$$(11 \text{ kg } CO_2/\text{kg } H_2)/(33.6 \text{ kW-hr/kgH}_2)/(1 \text{ mile/kW-hr}) = 0.33 \text{ kg } CO_2/\text{mile}.$$

In contrast, gasoline can release about 9 kg carbon dioxide per gallon. Merely by way of example, if a car gets 28 miles/gallon gasoline, the carbon dioxide release from 1 mole of cellulose may be equal to: 28 miles/gallon×0.33 kg $CO_2$/mile=9.24 kg $CO_2$/gallon. This is approximately equivalent to that released from gasoline. However, the cellulose process is renewable. If it is possible to achieve 5 miles/kW-hr $H_2$ that is 5 times of the conservative estimation of 1 mile/kW-hr $H_2$, then the hydrogen burn would be the equivalent to 5×28=140 miles/gallon gasoline equivalent release of carbon dioxide. Therefore, relatively less carbon dioxide may be produced from hydrogen burn.

The process for conversion of cellulosic biomass into hydrogen may enhance the recycling of cellulosic biomass products and turn its waste into power generation. For instance, the waste of cellulosic biomass includes forest floors that currently are not economical to recover, but present a serious fire hazard. If it becomes economical to recycle the cellulosic biomass waste through the use of the present invention, the hazard problem may be reduced. Other cellulosic biomass waste that currently ends up in the land fills may also be utilized through recycling.

While detailed descriptions of one or more embodiments have been given above, various alternatives, modifications, and equivalents will be apparent to those skilled in the art without varying from the spirit of the invention. Moreover, except where clearly inappropriate or otherwise expressly noted, it should be assumed that the features, devices, and/or components of different embodiments may be substituted and/or combined. Thus, the above description should not be taken as limiting the scope of the invention, which is defined by the appended claims.

What is claimed is:

1. A method for extracting hydrogen from a compound comprising carbon, oxygen, and hydrogen, the method comprising:
    determining an amount of water to combine with the compound, wherein:
        the determined amount of water to combine with the compound equals $M_w - W*M_T$;
        W equals a weight percent water of the compound;
        $M_w$ equals a mass water to add per mass of the compound as dry input mass; and
        $M_T$ equals a total mass of the compound;
    combining the determined amount of water with the compound to produce a wet form of the compound;
    transferring the wet form of the compound into a reaction processing chamber;
    heating the wet form of the compound within the reaction chamber such that elements comprised by the wet form of the compound dissociate and react with each other through at least a hydrous pyrolysis reaction, wherein one reaction product comprises hydrogen gas; and
    extracting the hydrogen gas, wherein extracting the hydrogen gas comprises passing reaction-product gases through a reduced pressure chamber to remove traces of unreacted carbon.

2. The method recited in claim 1 wherein the compound consists of carbon, oxygen, and hydrogen.

3. The method recited in claim 1 wherein the compound comprises cellulose.

4. The method recited in claim 1 wherein the compound comprises lignin.

5. The method recited in claim 1 wherein the compound comprises hemicellulose.

6. The method recited in claim 1 wherein the compound comprises a combination of cellulose, lignin, and/or hemicellulose.

7. The method recited in claim 1 further comprising providing a flow of an inert gas to the reaction chamber.

8. The method recited in claim 7 wherein the inert gas comprises at least argon or nitrogen.

9. The method recited in claim 1 wherein the extracted hydrogen gas is processed to generate at least electrical power or heat.

10. The method recited in claim 1 wherein the extracted hydrogen gas is processed to produce liquid fuels.

11. The method recited in claim 1 wherein the extracted hydrogen gas is processed by burning the hydrogen gas.

12. The method recited in claim 1 wherein the extracted hydrogen gas is processed by feeding the hydrogen gas into a fuel cell.

13. The method recited in claim 1 wherein the water comprises liquid water.

14. The method recited in claim 1 wherein extracting the hydrogen gas comprises passing reaction-product gases through a water-cooled chamber to remove unreacted water.

15. The method recited in claim 1 wherein heating the wet form of the compound comprises heating the wet form of the compound to a temperature between 700° C. and 1100° C.

16. The method recited in claim 1 wherein transferring the wet form of the compound into a reaction processing chamber occurs continuously.

17. The method recited in claim 16 wherein the continuous transfer of the wet form of the compound into the reactor that utilizes a geometry that reduces the presence of air.

18. The method recited in claim 1, wherein heating the wet form of the compound within the reaction chamber such that the elements comprised by the wet form of the compound dissociate and react with each other through at least the hydrous pyrolysis reaction occurs without an addition of steam.

19. The method recited in claim 1, wherein determining the amount of water to combine with the compound comprises:
    determining a weight percent water of the compound; and
    determining a remaining mass of water to combine with the compound to form the wet form of the compound, wherein the remaining mass of water depends on the determined weight percent water of the compound.

* * * * *

UNITED STATES PATENT AND TRADEMARK OFFICE
CERTIFICATE OF CORRECTION

PATENT NO. : 9,698,439 B2  Page 1 of 1
APPLICATION NO. : 12/758355
DATED : July 4, 2017
INVENTOR(S) : Weaver et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 78 days.

Signed and Sealed this
Twenty-fifth Day of September, 2018

Andrei Iancu
*Director of the United States Patent and Trademark Office*